US005740881A

United States Patent [19]
Lensak

[11] Patent Number: 5,740,881
[45] Date of Patent: Apr. 21, 1998

[54] SAFETY DEVICE FOR DETECTING IMPROPER POSITIONING OF A LADDER

[76] Inventor: Michael Lensak, 124 Weinmanns Blvd., Wayne, N.J. 07470

[21] Appl. No.: 744,656

[22] Filed: Sep. 6, 1996

[51] Int. Cl.⁶ ............................................. E06C 5/34
[52] U.S. Cl. ......................... 182/18; 33/366; 33/391
[58] Field of Search ............................ 182/18; 33/1 N,
  33/366, 391; 200/61.52; 340/689

[56] References Cited

U.S. PATENT DOCUMENTS

| | | | |
|---|---|---|---|
| 3,012,633 | 12/1961 | Magee | 182/18 X |
| 3,118,234 | 1/1964 | Wilson | 182/18 X |
| 3,161,739 | 12/1964 | Suozzo | 340/689 X |
| 3,233,235 | 2/1966 | Wright | 340/689 X |
| 3,295,833 | 1/1967 | Everett | 340/272 X |
| 3,696,372 | 10/1972 | Garrett et al. | 182/18 X |
| 4,297,690 | 10/1981 | Baker | 340/689 X |
| 4,311,208 | 1/1982 | Macrorie et al. | 182/18 |
| 4,484,186 | 11/1984 | Wood et al. | 340/689 |
| 4,554,994 | 11/1985 | Weiner | 182/18 |
| 4,688,025 | 8/1987 | Frank | 340/689 X |
| 5,547,412 | 8/1996 | Wilcox | 182/18 X |

*Primary Examiner*—Leslie A. Braun
*Assistant Examiner*—Richard M. Smith

[57] ABSTRACT

A safety device for detecting improper positioning of a ladder including an alarm connected to an energy source. A longitudinal and lateral level indicator switch are connected between the alarm and energy source with a first orientation for precluding power transfer to the alarm when the ladder is orientated in a safe disposition. The switches further have a second orientation for allowing power transfer to the alarm when the ladder is oriented in a dangerous disposition. Finally, an actuator switch is included for activating the device solely during use.

3 Claims, 3 Drawing Sheets

SAFETY DEVICE FOR DETECTING IMPROPER POSITIONING OF A LADDER

BACKGROUND OF THE INVENTION

1. Field of the Invention

The present invention relates to a safety device for detecting improper positioning of a ladder and more particularly pertains to indicating when a ladder is oriented in an unsafe disposition.

2. Description of the Prior Art

The use of ladder levelling devices are known in the prior art. More specifically, ladder levelling devices heretofore devised and utilized for the purpose of leveling the disposition of a ladder are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,339,921 to Faupel discloses a ladder leveling device comprising an adjustable base unit for leveling the support legs of a ladder. U.S. Pat. No. 5,007,503 to Sturm discloses an automative leveling device for attachment to a ladder comprising a pair of adjustable, telescopic legs extending therefrom. U.S. Pat. Des. 316,608 to Wagner discloses the ornamental design for a ladder leveling attachment. Lastly, U.S. Pat. No. 4,683,980 to Vayko; U.S. Pat. No. 5,273,133 to Thocher et al.; and U.S. Pat. No. 5,174,412 to Vega are provided as being of general interest.

In this respect, the safety device for detecting improper positioning of a ladder according to the present invention substantially departs from the conventional concepts and designs of the prior art, and in so doing provides an apparatus primarily developed for the purpose of indicating when a ladder is oriented in an unsafe disposition.

Therefore, it can be appreciated that there exists a continuing need for new and improved safety device for detecting improper positioning of a ladder which can be used for indicating when a ladder is oriented in an unsafe disposition. In this regard, the present invention substantially fulfills this need.

SUMMARY OF THE INVENTION

In view of the foregoing disadvantages inherent in the known types of ladder levelling devices now present in the prior art, the present invention provides an improved safety device for detecting improper positioning of a ladder. As such, the general purpose of the present invention, which will be described subsequently in greater detail, is to provide a new and improved safety device for detecting improper positioning of a ladder apparatus and method which has all the advantages of the prior art and none of the disadvantages.

To attain this, the present invention essentially comprises a rectangular enclosure coupled to the outer side of a ladder at a lower extent thereof with a plurality of screws. A solar cell energy source is positioned on a front face of the enclosure. An actuator switch comprises a foot of the ladder having a pivot extending therefrom. Further included is an ovular bore with linear longitudinal side edges and arcuate ends for receiving the pivot therein. A post abuts the pivot and extends into an aperture located on a lower end of the enclosure. The post has an associated switch positioned about the post within the enclosure and is connected in series with the energy source. A pivot cover is coupled about the pivot and bore for the protection thereof. A spring is positioned between the cover and lower end of the enclosure. The spring has a biased orientation for closing the associated switch upon use of the ladder and an unbiased orientation for opening the associated switch after use of the ladder. An audio alarm is situated within the enclosure adjacent to a grill formed therein. The alarm is connected in series with the actuator switch and energy source.

Longitudinal and lateral level indicator switches are connected in series with the alarm, actuator switch and energy source. Each level indicator switch includes a conductive, weighted pendulum pivotally coupled thereto at an inboard end thereof. Each pendulum has a contact protrusion extending from an intermediate portion thereof. Indicia are positioned beneath the pendulum for inspection by a user. The indicia comprise an arcuate strip with an intermediate portion and a pair of end portions. Arcuate conductive contact plates are positioned for contact with the contact protrusion for activating the alarm upon the improper positioning of the ladder.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety device for detecting improper positioning of a ladder which has all the advantages of the prior art ladder levelling devices and none of the disadvantages.

It is another object of the present invention to provide a new and improved safety device for detecting improper positioning of a ladder which may be easily and efficiently manufactured and marketed.

It is a further object of the present invention to provide a new and improved safety device for detecting improper positioning of a ladder which is of a durable and reliable construction.

An even further object of the present invention is to provide a new and improved safety device for detecting improper positioning of a ladder which is susceptible of a low cost of manufacture with regard to both materials and labor, and which accordingly is then susceptible of low prices of sale to the consuming public, thereby making such safety device for detecting the improper positioning of a ladder economically available to the buying public.

3

Still yet another object of the present invention is to provide a new and improved safety device for detecting improper positioning of a ladder which provides in the apparatuses and methods of the prior art some of the advantages thereof, while simultaneously overcoming some of the disadvantages normally associated therewith.

Still another object of the present invention is to indicate when a ladder is oriented in an unsafe disposition.

Lastly, it is an object of the present invention to provide a safety device for detecting improper positioning of a ladder including an alarm connected to an energy source. A longitudinal and lateral level indicator switch are connected between the alarm and energy source with a first orientation for precluding power transfer to the alarm when the ladder is orientated in a safe disposition. The switches further have a second orientation for allowing power transfer to the alarm when the ladder is oriented in a dangerous disposition. Finally, an actuator switch is included for activating the device solely during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
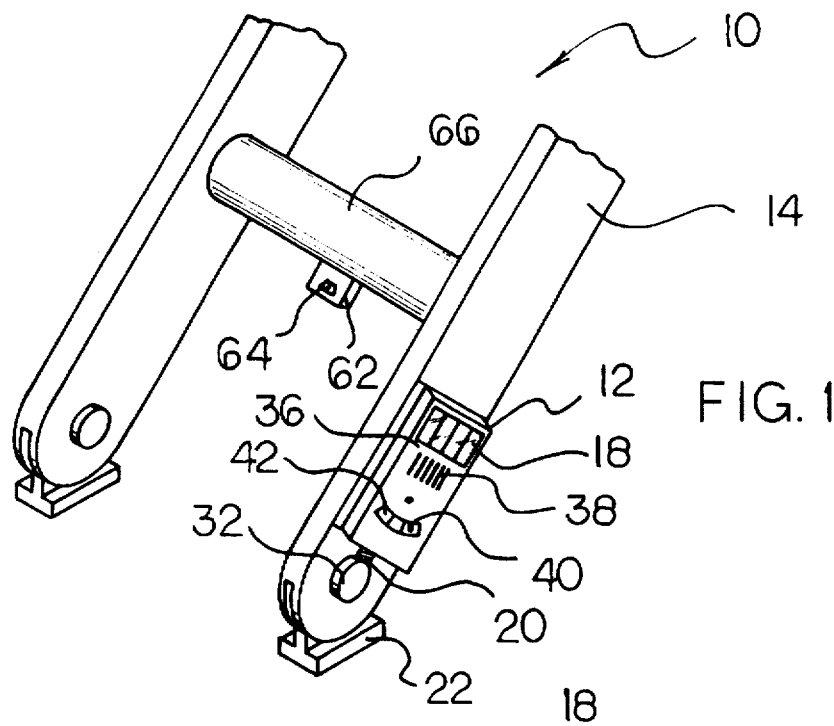
FIG. 1 is a perspective illustration of the preferred embodiment of the safety device for detecting improper positioning of a ladder constructed in accordance with the principles of the present invention.
Figure 2:
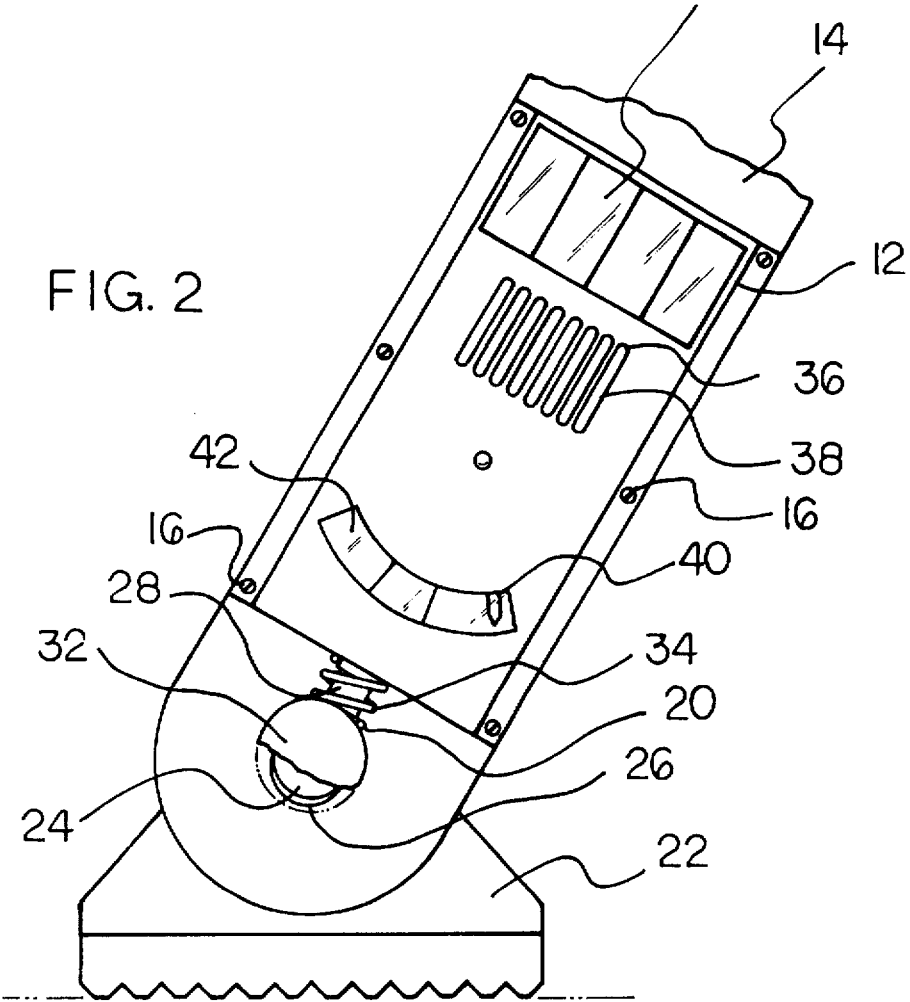
FIG. 2 is a plan side view of the present invention.
Figure 3:
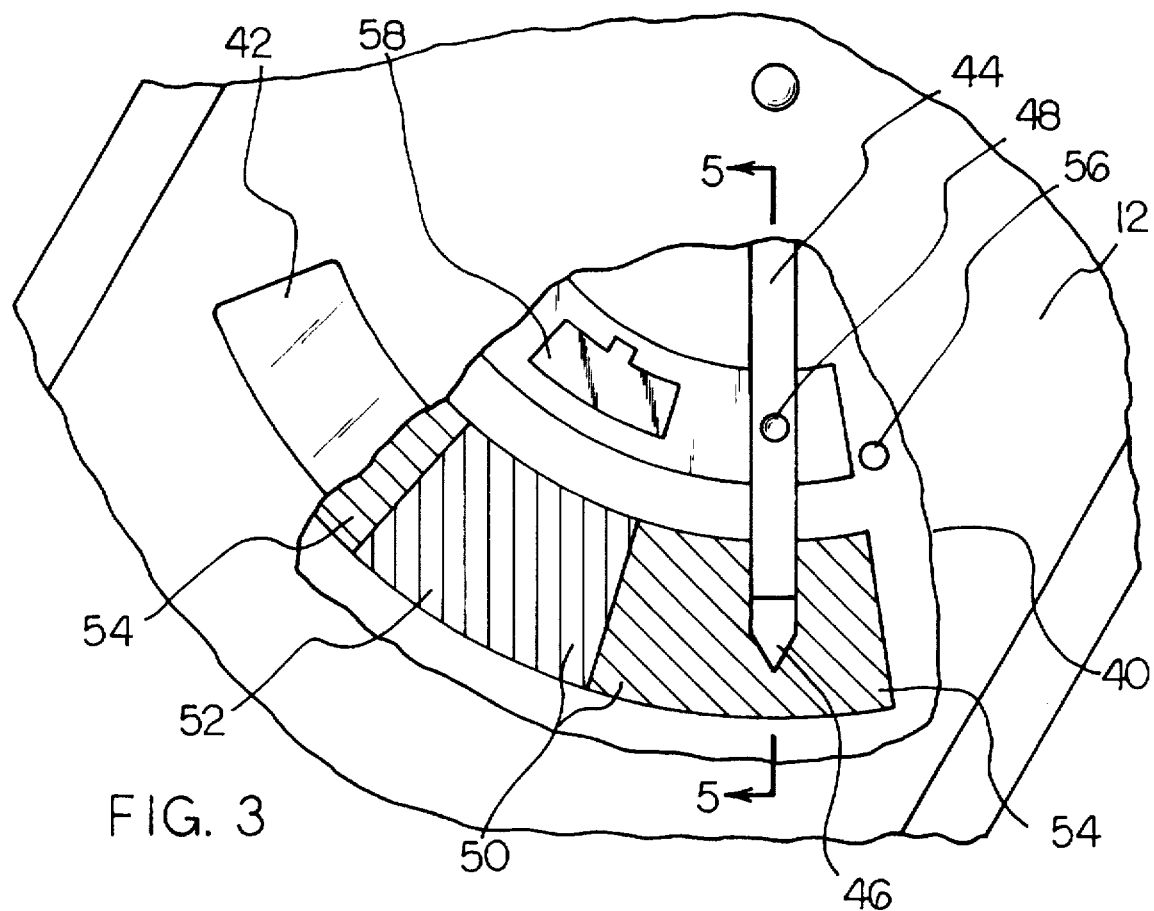
FIG. 3 is a cutout view of the longitudinal level detector.
Figure 4:
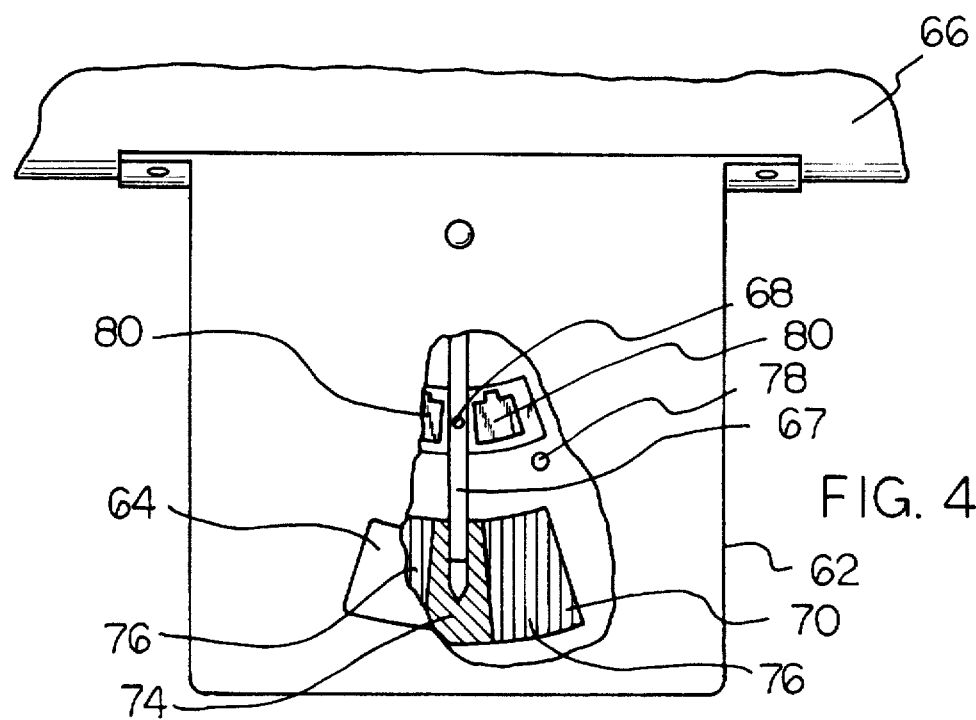
FIG. 4 is a cutout view of the lateral level detector.
Figure 5:
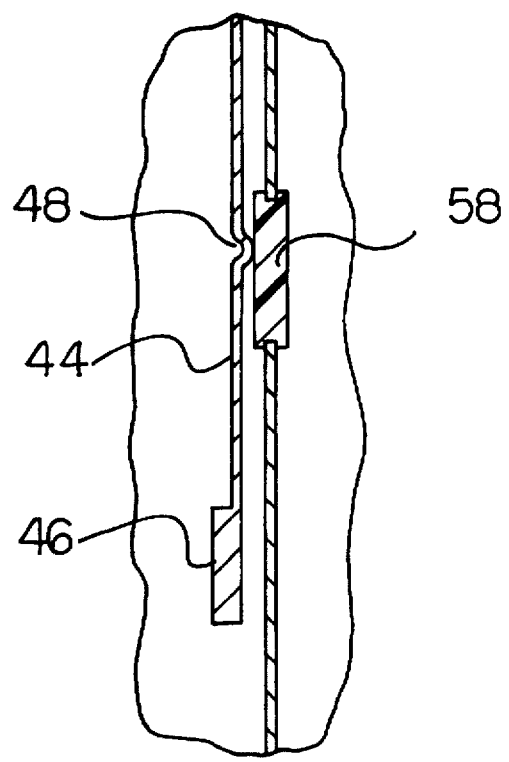
FIG. 5 is a cross-sectional view taken along the Line 5—5 depicted in FIG. 3.
Figure 6:
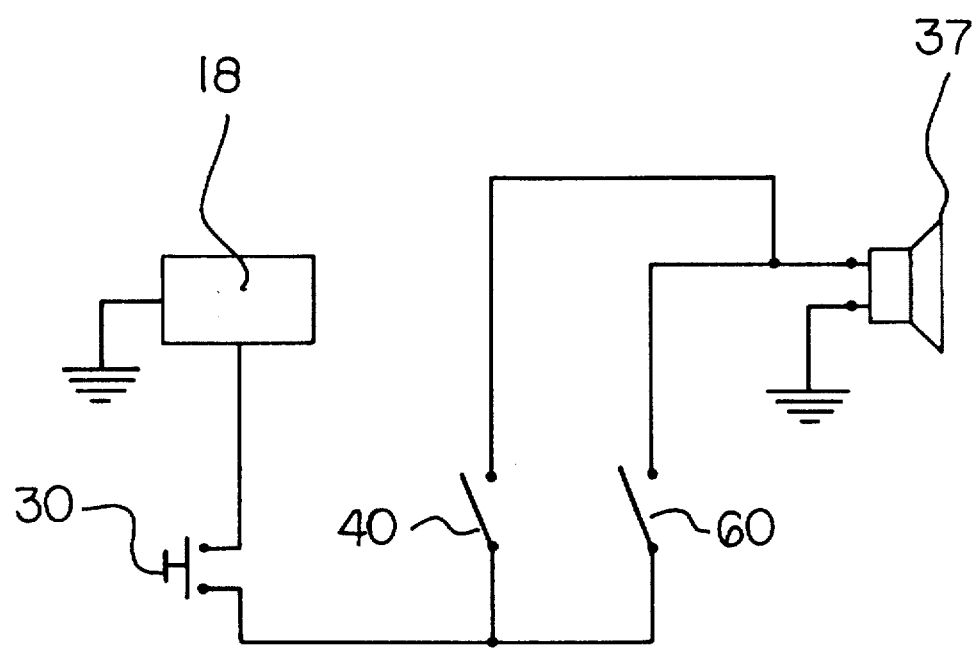
FIG. 6 is a schematic depicting the circuitry employed in the present invention.

With reference now to the drawings, and in particular to FIG. 1 thereof, a new and improved safety device for detecting improper positioning of a ladder embodying the principles and concepts of the present invention and generally designated by the reference numeral 10 will be described.

The present invention, the new and improved safety device for detecting improper positioning of a ladder, is comprised of a plurality of components. Such components in their broadest context include an enclosure, energy source, alarm, actuator switch, longitudinal level detector and lateral level detector. Such components are individually configured and correlated with respect to each other so as to attain the desired objective.

4

More specifically, it will be noted that the system 10 of the present invention includes a rectangular enclosure 12 coupled to the outer side of a ladder 14 at a lower extent thereof with a plurality of screws 16. A solar cell energy source 18 is positioned on a front face thereof. Other types of energy sources may be employed in lieu of the solar cell such as a traditional battery.

For enabling and disabling the device, an actuator switch 20 is included. The actuator switch comprises a foot 22 of the ladder having a circular pivot 24 extending horizontally therefrom. A generally ovular bore 26 with linear longitudinal side edges and arcuate ends is included for receiving the pivot 24 therein. A post 28 abuts the pivot and extends into an aperture located on a lower end of the enclosure. The post has an associated switch 30 positioned within the enclosure and is connected in series with the energy source. A pivot cover 32 is coupled about the pivot and bore for the protection thereof. A spring 34 is positioned about the spring between the cover and lower end of the enclosure. The spring has a biased orientation for closing the associated switch upon use of the ladder and an unbiased orientation for opening the associated switch when the ladder is not in use.

For alerting a user and bystanders, an audio alarm 36 comprising a buzzer 37 is situated within the enclosure adjacent to a grill 38 formed therein. The alarm is connected in series with the actuator switch and energy source.

A longitudinal level indicator switch 40 is positioned within the enclosure adjacent to an arcuate view window 42 and further connected in series with the alarm, actuator switch and energy source. The longitudinal level indicator switch 40 includes a conductive pendulum 44 pivotally coupled within the enclosure at an inboard end thereof. The pendulum has a weight 46 formed at an outboard end thereof and a contact protrusion 48 extending from an intermediate portion thereof. Indicia 50 is positioned beneath the pendulum adjacent to the view window 42 for inspection by a user. The indicia comprises an arcuate strip with an intermediate portion with a red hue 52 and a pair of end portions with a green hue 54. A pair of detents 56 are each positioned adjacent to the end portions for constraining movement of the pendulum. An arcuate conductive contact plate 58 is positioned adjacent to the intermediate portion of the indicia for contact with the contact protrusion 48.

The longitudinal level indicator has a first orientation for precluding power transfer to the alarm when the ladder is orientated no more than a predetermined angle with respect to the horizontal. Such an angle is governed by the OSHA and/or UL standards. The longitudinal level indicator switch further has a second orientation for allowing power transfer to the alarm when the ladder is oriented at least the predetermined angle with respect to the horizontal.

A lateral level indicator switch 60 is positioned within a housing 62 adjacent to a lower rung 66 of the ladder with an arcuate view window 64 disposed thereon. The lateral level indicator switch 60 is connected in parallel with the longitudinal level indicator switch and includes a conductive, weighted pendulum 67 pivotally coupled within the enclosure at an inboard end thereof. The pendulum has a contact protrusion 68 extending from an intermediate portion thereof. Indicia 70 are positioned beneath the pendulum and adjacent to the view window for inspection by a user. The indicia comprises an arcuate strip having an intermediate portion with a green hue 74 and a pair of end portions with a red hue 76. A pair of detents 78 are each positioned adjacent to the end portions for constraining movement of the pendulum. A pair of arcuate conductive contact plates 80 are each positioned adjacent to the end portions of the indicia for contact with the contact protrusion 68.

The lateral level indicator switch has a first orientation for precluding power transfer to the alarm when the ladder is orientated no more than a predetermined angle with respect the vertical. Such an angle is governed by the OSHA and/or UL standards. The lateral level indicator switch has a second orientation for allowing power transfer to the alarm when the ladder is oriented at least the predetermined angle with respect to the vertical.

The present invention provides a safety measure which prevents ladder slippage resulting from the improper positioning thereof. The ladder safety device for detecting improper positioning thereof includes an actuator switch which automatically activates solely during use thus offering a device which can be conveniently employed by a user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety device for detecting improper positioning of a ladder comprising:

an alarm connected to an energy source;

a lateral level indicator switch coupled to a rung of a ladder and connected between the alarm and energy source with a first orientation for precluding power transfer to the alarm when the ladder is orientated no more than a predetermined angle with respect to a vertical axis, the lateral level indicator switch having a second orientation for allowing power transfer to the alarm when the ladder is oriented at least a predetermined angle with respect to the vertical axis; and an actuator switch means with an associated switch coupled thereto and connected between the energy source and alarm and a spring having a biased orientation for closing the associated switch upon use of the ladder and an unbiased orientation for opening the associated switch after use of the ladder.

2. The safety device for detecting improper positioning of a ladder as set forth in claim 1 wherein the lateral level indicator switch includes:

a conductive, weighted pendulum pivotally coupled to the ladder, the pendulum having a contact protrusion extending from an intermediate portion thereof; indicia positioned beneath the pendulum and adjacent to the view window for inspection by a user, the indicia comprising an arcuate strip having an intermediate portion with a green hue and a pair of end portions with a red hue; a pair of detents, each detent positioned adjacent to the end portions for constraining movement of the pendulum; and a pair of arcuate conductive contact plates, each contact plate positioned adjacent to the end portions of the indicia for contact with the contact protrusion.

3. A new and improved safety device for detecting improper positioning of a ladder, comprising, in combination:

a rectangular enclosure coupled to an outer side of a ladder at a lower extent thereof with a plurality of screws;

a solar cell energy source positioned on a front face of the enclosure;

an actuator switch comprising a foot of the ladder having a pivot extending therefrom; a generally ovular bore with linear longitudinal side edges and arcuate ends for receiving the pivot therein; a post abutting the pivot and extending into an aperture located on a lower end of the enclosure, the post having an associated switch positioned within the enclosure and connected in series with the energy source; a pivot cover coupled about the pivot and bore for the protection thereof; and a spring positioned about the post between the cover and lower end of the enclosure, the spring having a biased orientation for closing the associated switch upon use of the ladder and an unbiased orientation for opening the associated switch after use of the ladder;

an audio alarm situated within the enclosure adjacent to a grill formed therein, the alarm connected in series with the actuator switch and energy source;

a longitudinal level indicator switch positioned within the enclosure adjacent to an arcuate view window and connected in series with the alarm, actuator switch and energy source; the longitudinal level indicator switch including a conductive, weighted pendulum pivotally coupled within the enclosure at an inboard end thereof, the pendulum having a contact protrusion extending from an intermediate portion thereof; indicia positioned beneath the pendulum adjacent to the view window for inspection by a user, the indicia comprising an arcuate strip with an intermediate portion with a red hue and a pair of end portions with a green hue; a pair of detents, each detent positioned adjacent to the end portions for constraining movement of the pendulum; and an arcuate conductive contact plate positioned adjacent to the intermediate portion of the indicia for contact with the contact protrusion; and a lateral level indicator switch positioned within a housing with an arcuate view window and connected in parallel with the longitudinal level indicator switch; the lateral level indicator switch including a conductive, weighted pendulum pivotally coupled within the enclosure at an inboard end thereof, the pendulum having a contact protrusion extending from an intermediate portion thereof; indicia positioned beneath the pendulum and adjacent to the view window for inspection by a user, the indicia comprising an arcuate strip with an intermediate portion with a green hue and a pair of end portions with a red hue; a pair of detents, each detent positioned adjacent to the end portions for constraining movement of the pendulum; and a pair of arcuate conductive contact plates, each contact plate positioned adjacent to the end portions of the indicia for contact with the contact protrusion.

* * * * *